No. 808,862. PATENTED JAN. 2, 1906.
J. A. McCAIN.
SPIRIT LEVEL.
APPLICATION FILED APR. 8, 1905.
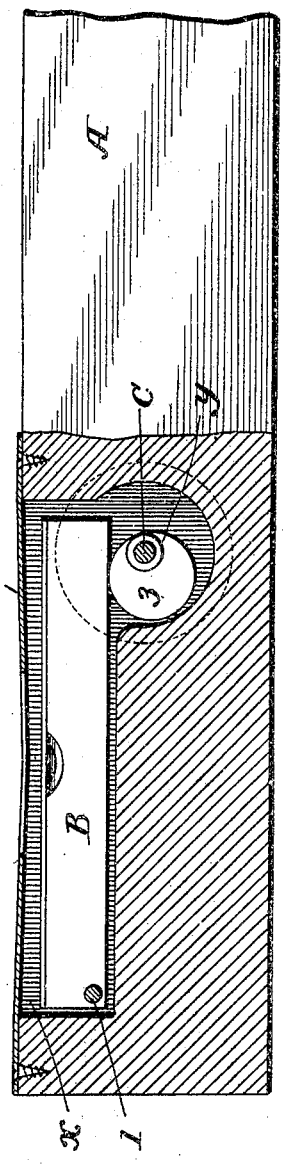
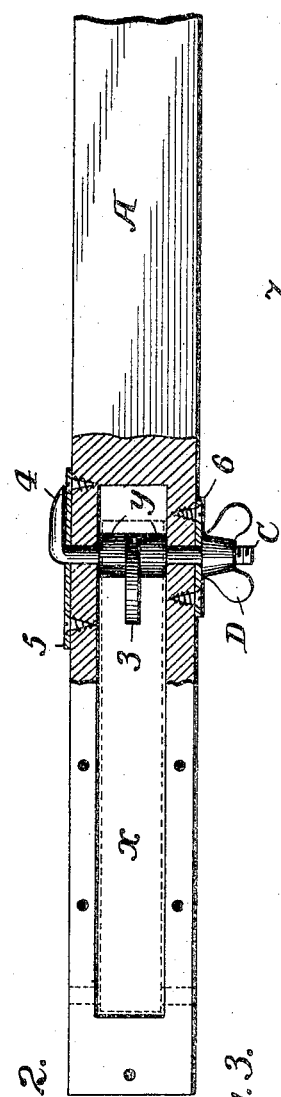
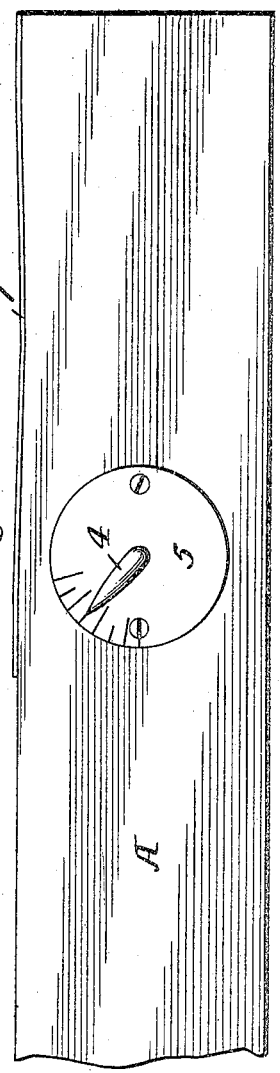

UNITED STATES PATENT OFFICE.

JOHN A. McCAIN, OF ATLANTA, GEORGIA, ASSIGNOR OF ONE-HALF TO LOUIS J. CASSELS, OF DECATUR, GEORGIA.

SPIRIT-LEVEL.

No. 808,862.     Specification of Letters Patent.     Patented Jan. 2, 1906.

Application filed April 8, 1905. Serial No. 254,577.

*To all whom it may concern:*

Be it known that I, JOHN A. McCAIN, a citizen of the United States, residing at Atlanta, in the county of Fulton, State of Georgia, have invented certain new and useful Improvements in Spirit-Levels, of which the following is a specification.

My invention relates to leveling and plumbing instruments; and it consists of a chambered bar provided with a pivoted spirit-level and a shaft and cam for adjusting the same to an extent indicated by a pointer on the shaft, as fully set forth hereinafter and as illustrated in the accompanying drawings, in which—

Figure 1 is a view in part longitudinal section, illustrating my improved instrument; Fig. 2, an edge view in part section; Fig. 3, a side view showing the pointer and graduations.

The body of the instrument is a bar A, which is recessed from one edge near the end to form a chamber $x$, and within the latter a spirit-level B of any suitable character is pivoted by a transverse pivot or pin 1. Through the bar and through the chamber beneath the free end of the level extends a shaft C, upon which is a cam 3, the latter being arranged so that the free end of the level will rest thereon, as shown. At one end of the shaft is a pointer 4, which as the shaft is turned can be carried over a series of graduations upon the face of the bar or, preferably, upon a plate 5, secured to the bar. These graduations are of such a character in respect to the level and the form of the cam that the graduation or mark opposite the pointer in any position to which it may be set will indicate the inclination of the bar when the level is horizontal either in degrees or the number of inches in a given number of feet, as may be desired.

As it is sometimes desirable to secure the shaft and its pointer in any position in which the same may be set, I provide the shaft with a shoulder $y$ opposite the inner wall of the chamber and thread the outer end of the shaft to receive a nut D, which bears upon the side of the bar or upon a plate 6.

To retain the level from swinging outward, and to cover the chamber $x$, I provide a plate 7, secured to the edge of the bar above the chamber and with a recess through which the bubble of the level may be observed.

Without limiting myself to the precise construction and arrangement shown, I claim—

1. A leveling and plumbing instrument consisting of a bar having a chamber therein, a level pivoted within said chamber, a shaft extending transversely through said chamber and through the bar, a cam on the shaft below the level, and a pointer on said shaft outside the bar, the latter having a graduated scale adjacent to the pointer, substantially as described.

2. The combination of the chambered bar, a level pivoted therein, a shaft extending through the bar and provided with a cam on which the level rests, with a pointer, and with a shoulder opposite the inner wall of the chamber, and a nut on the shaft whereby said shoulder may be brought into frictional contact with the said wall, substantially as described.

In testimony whereof I have signed my name to this specification in the presence of two subscribing witnesses.

JOHN A. McCAIN.

Witnesses:
   JAS. B. HOYL,
   JOHN W. JONES.